(12) United States Patent
Podjarny et al.

(10) Patent No.: US 11,755,460 B2
(45) Date of Patent: *Sep. 12, 2023

(54) IDENTIFYING FLAWED DEPENDENCIES IN DEPLOYED APPLICATIONS

(71) Applicant: Snyk Limited, London (GB)

(72) Inventors: Guy Podjarny, London (GB); Assaf Hefetz, Holon (IL)

(73) Assignee: SNYK LIMITED, London (GB)

( * ) Notice: Subject to any disclaimer, the term of this patent is extended or adjusted under 35 U.S.C. 154(b) by 226 days.

This patent is subject to a terminal disclaimer.

(21) Appl. No.: 16/823,393

(22) Filed: Mar. 19, 2020

(65) Prior Publication Data

US 2020/0272556 A1    Aug. 27, 2020

Related U.S. Application Data

(63) Continuation of application No. 15/909,458, filed on Mar. 1, 2018, now Pat. No. 10,691,577.
(Continued)

(51) Int. Cl.
*G06F 11/36* (2006.01)
*G06F 8/60* (2018.01)
(Continued)

(52) U.S. Cl.
CPC ............. *G06F 11/366* (2013.01); *G06F 8/60* (2013.01); *G06F 16/2379* (2019.01); *G06F 16/245* (2019.01)

(58) Field of Classification Search
CPC ...... G06F 8/60; G06F 11/366; G06F 16/2379; G06F 16/245
See application file for complete search history.

(56) References Cited

U.S. PATENT DOCUMENTS 7,774,147 B1 * 8/2010 Manaev ............ G06F 11/1433
702/179
8,296,758 B2 * 10/2012 Kabadiyski ............ G06F 8/60
717/174
(Continued)

FOREIGN PATENT DOCUMENTS

WO    WO-2017173344 A1 * 10/2017 .......... G06F 11/1471

OTHER PUBLICATIONS

Author unknown, "The system and method of automatically detecting common deployment time dependency for enterprise or OSGI applications using declarative approach and re-use the common dependency for runtime environment", pp. 1-4, IPCOM000212195D, IP.com Electronic Publication: Nov. 4, 2011, (Year: 2011).*
(Continued)

*Primary Examiner* — S. Sough
*Assistant Examiner* — Zheng Wei
(74) *Attorney, Agent, or Firm* — Tutunjian & Bitetto, P.C.

(57) ABSTRACT

Flaws in dependencies of deployed applications are identified. In one embodiment, a list of dependencies used by a deployed application that is deployed on the deployment platform is obtained. Each dependency of the list of dependencies is mapped with a flaws database, wherein the flaws database comprising an indication of known flaws for different dependencies and different versions thereof. Based on such mapping, one or more flaws in the deployed application are determined. The determination is performed externally to the deployment platform and without executing a monitoring process thereon.

20 Claims, 4 Drawing Sheets

Related U.S. Application Data (60) Provisional application No. 62/467,031, filed on Mar. 3, 2017.

(51) Int. Cl.
   *G06F 16/245* (2019.01)
   *G06F 16/23* (2019.01)

(56) References Cited

U.S. PATENT DOCUMENTS

| | | | | |
|---|---|---|---|---|
| 9,916,233 | B1* | 3/2018 | Qureshi | G06F 9/45533 |
| 10,235,527 | B1 | 3/2019 | Dalessio | G06F 16/951 |
| 10,318,285 | B1* | 6/2019 | Jodoin | G06F 11/3612 |
| 2006/0031827 | A1* | 2/2006 | Barfield | G06F 8/65 |
| | | | | 717/168 |
| 2006/0184926 | A1* | 8/2006 | Or | G06F 8/61 |
| | | | | 717/168 |
| 2009/0265699 | A1* | 10/2009 | Toeroe | G06F 8/65 |
| | | | | 717/168 |
| 2011/0225217 | A1* | 9/2011 | Plax | G06F 16/2379 |
| | | | | 707/825 |
| 2012/0278797 | A1* | 11/2012 | Secrist | G06F 8/71 |
| | | | | 717/176 |
| 2015/0268948 | A1 | 9/2015 | Plate | G06F 8/71 |
| | | | | 717/123 |
| 2017/0097818 | A1* | 4/2017 | Heine | H04L 67/34 |
| 2018/0034924 | A1* | 2/2018 | Horwood | H04L 67/40 |
| 2018/0276104 | A1* | 9/2018 | Calla | G06F 8/65 |

OTHER PUBLICATIONS

Avram, A. FaaS, PaaS, and the Benefits of the Serverless Architecture. Jun. 25, 2016 (retrieved on Oct. 14, 2019). Retrieved from the Internet <URL: https://www.infoq.com/news/2016/06/faas-serverless-architecture/>.

* cited by examiner

IDENTIFYING FLAWED DEPENDENCIES IN DEPLOYED APPLICATIONS

CROSS-REFERENCE TO RELATED APPLICATION

This application claims the benefit of and is a continuation of U.S. Non-Provisional patent application Ser. No. 15/909,458, filed Mar. 1, 2018, now U.S. Pat. No. 10,691,577, which claims the benefit of U.S. Provisional Application No. 62/467,031 filed Mar. 3, 2017, entitled "MONITORING OF A DEPLOYED APPLICATION", all of which are hereby incorporated by reference in their entirety without giving rise to disavowment.

TECHNICAL FIELD

The present disclosure relates to server-based deployment of applications in general, and to deployed applications incorporating dependencies, in particular.

BACKGROUND

Deployed servers today may typically contain, on top of the operating system they run, many third party components, also referred to as dependencies. Most prominent example of such third party components may be open source components. The third party components may be curated in and consumed through repositories maintained by the operating system provider. Examples of such repositories may be: Yellowdog Updater, Modified (YUM) running on RedHat™ & Fedora™ Linux operating systems, Advanced Packaging Tool (APT) on Ubuntu™ and other Debian™ Linux systems, or Microsoft™'s OneGet/PackageManagement system.

In some exemplary embodiments, a deployed server may include hundreds, if not thousands, such dependencies. The dependencies may be included in the form of binary libraries or executable files, or other forms. Examples of such components may include the Apache™ web server, OpenSSL™ library, ImageMagick™ binary and library, and the bash terminal shell.

Dependencies may have flaws, such as security bugs, vulnerabilities, license flaws, or the like. New flaws may be discovered and disclosed on different dependencies at an inconsistent pace. However, since a typical server consumes many such dependencies, there may be a constant stream of relevant newly disclosed flaws on components run by such a server, requiring updates or patching to the components now known to be flawed.

When the frequency of flaw disclosure is combined with the massive and growing adoption of those components across the Internet, and the sheer number of servers every organization manages, it is very hard for organization to systematically and continuously protect themselves from flawed dependencies.

dependencies having security flaws may be one of the top security threats on the web today. Reports from Verizon™ and others state that the vast majority of successful exploits today are caused by "unpatched servers"—servers that did not consume the latest security fixes. Symantec™ estimates that by 2020, 99% of successful exploits will be caused by vulnerabilities that have been publicly known for over a year.

This need led to the existence of various security products, including a class of products referred to as Infrastructure Monitoring tools. The Infrastructure Monitoring tools may track which dependencies (and typically, Open Source Software (OSS) dependencies) are installed on each server, correlate them to known vulnerabilities and alert (or at times remediate) accordingly. Examples of Infrastructure Monitoring tools may be Tanium™, New Relic™ Infrastructure Monitoring.

In addition, each dependency may be covered by a different legal-binding license which may affect the rights and commitments of the owner of the deployed application that incorporated the dependencies, such as in case of copy-left licenses, licenses requiring attribution, licenses requiring the owner to provide a royalty-free license for her patents, or the like. As a result, the dependency may be considered flawed as it may impose limitations on the owner of the application.

BRIEF SUMMARY

One exemplary embodiment of the disclosed subject matter is a method performed by a processing apparatus external to a deployment platform, wherein said method comprising: obtaining a list of dependencies used by a deployed application that is deployed on the deployment platform; mapping each dependency of the list of dependencies with a flaws database, wherein the flaws database comprising an indication of known flaws for different dependencies and different versions thereof; and based on said mapping, determining one or more flaws in the deployed application, wherein said determining the one or more flaws is performed externally to the deployment platform and without executing a monitoring process thereon.

The method may further comprise filtering the one or more flaws using a criteria, whereby obtaining one or more reportable flaws; and reporting the one or more reportable flaws to a developer of the deployed application; whereby reporting potential flaws in deployed application without executing processes on the deployment platform, using an external processing apparatus in network communication with the deployment platform to mitigate a lack of processing resources available at the deployment platform.

Optionally, said obtaining the list of dependencies comprises one of the following: sending a query via an Application Programming Interface (API) of the development platform to obtain the list of dependencies of the deployed application; obtaining via an Application Programming Interface (API) of the development platform application files of the deployed application, wherein the application files are files uploaded to the deployment platform by the developer of the deployed application at or before deployment thereof; and extracting from the application files, the list of dependencies; and obtaining a package specification of the deployed application and extrapolating the list of dependencies based on the package specification and based on a time of deployment of the deployed application.

Optionally, said obtaining the list of dependencies comprising: retrieving a package specification of an application from a deployment platform, wherein the application is deployed on the deployment platform, wherein said retrieving is performed in response to a retrieval query sent to the deployment platform; determining a time of deployment of the application, wherein the time of deployment is a time when the application was deployed on the deployment platform; and resolving the package specification based on the time of deployment, wherein said resolving comprises determining a set of dependencies that were obtained by the deployment platform at the time of deployment in order to satisfy the package specification, wherein said determining is performed by mimicking the resolution performed by the deployment platform.

Optionally, the method further comprising selecting a package specification resolution module from a plurality of package specification resolution modules, wherein said selecting is performed based on an identity of the deployment platform, wherein said selecting is performed so as to obtain a package specification resolution module that mimics an operation of the deployment platform.

Optionally, said determining the time of deployment comprises querying the deployment platform.

Optionally, the package specification is a specification file comprising a list of dependencies, wherein for each dependency in the list of dependencies, the specification file provides a version indication, wherein said resolving comprises resolving the version indication to determine a version that has been retrieved at the time of deployment based on the version indication and based on versions that were available at the time of deployment.

Optionally, said resolving comprises resolving a version indication of a dependency, as defined in the package specification, to determine a version that has been retrieved at the time of deployment based on the version indication and based on versions that were available to the deployment platform at the time of deployment.

Optionally, the deployment platform is a Function as a Service (FaaS) platform upon which the application deployed or a Platform as a Service (PaaS) platform upon which the application is deployed.

Optionally, the method further comprising: monitoring updates in the flaws database to identify flaws relevant for the application; and in response to identifying a new flaw in the application, reporting the new flaw.

Optionally, the method further comprising: determining, based on user-defined criteria, whether a determined flaw is to be reported; and reporting only a subset of the flaws that match the user-defined criteria.

Another exemplary embodiment of the disclosed subject matter is an apparatus comprising processor and memory, wherein said apparatus comprising: a flaws database retaining records indicating known flaws in dependencies; a server querying module configured to query a deployment platform on which an application is deployed, wherein said server querying module is configured to retrieve a package specification from the deployment platform; a deployment time determination module configured to determine a time of deployment of the application on the deployment platform; a package specification resolution module, wherein said package specification resolution module is configured to determine a set of dependencies that were obtained by the deployment platform at the time of deployment in order to satisfy the package specification; a flaws detection module configured to query the flaws database to retrieve a set of flaws in the set of dependencies; and a reporting module configured to provide an output indicating the set of flaws to an administrator of the application.

Optionally, the apparatus comprising a plurality of package specification resolution modules each of which associated with a different deployment platform, wherein each package specification resolution module is configured to mimic resolution of the package specification as performed by the associated deployment platform; and wherein based on an identity of the deployment platform upon which the application is deployed, said apparatus is configured to select said package specification resolution module from said plurality of said package specification resolution module to be utilized.

Optionally, said plurality of package specification resolution modules are configured to provide non-identical results when applied on the package specification.

Optionally, said package specification resolution module is configured to provide non-identical results when applied on the package specification with different times of deployment.

Optionally, the deployment platform is a Function as a Service (FaaS) platform upon which the application deployed.

Optionally, the deployment platform is a Platform as a Service (PaaS) platform upon which the application is deployed.

Optionally, the apparatus further comprising a monitoring module, wherein said monitoring module is configured to monitor for updates in the flaws database, and invoke said reporting module based on new flaws relevant to the application.

Optionally, the package specification is a specification file comprising a list of dependencies, wherein for each dependency in the list of dependencies, the specification file provides a version indication.

Optionally, for at least one of the dependencies in the list of dependencies, the version indication is one of the following: a minimal version number; a maximal version number; a version compatible with another identified version; an expression using wildcards representing the version number; and a range of versions.

Optionally, the known flaws comprise at least one of: security vulnerabilities; license flaws; internal policy violations; and external regulation violations.

Optionally, the flaws database indicating different flaws of different version of a same dependency.

Optionally, the set of dependencies is a set of code package dependencies.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt by the disclosed subject matter may be to enable utilization of knowledge of flaws in dependencies regarding deployed applications.

Another technical problem may be to enable to practice of re-using code, such as using OSS packages and other third-party code.

Yet another technical problem may be to identify utilized dependencies without being granted access to the runtime environment which executes the application. In some cases, the identification of dependencies may be performed in retrospect and not at the time of the deployment.

Yet another technical problem may be to enable identification of dependencies in serverless platforms, such as in Function as a Service (FaaS), where infrastructure monitoring products cannot be utilized.

In some exemplary embodiments, dependencies may help programmers develop software faster by sparing them the need to create functionality, that other developers have already implemented. Instead of writing such functionality, a developer may state the package she needs and may have it available as a library or module in her code. The sizes of the packages may vary. Some packages may be extremely big, such as providing the functionality of a full web servers (e.g. Express.js™). In other cases, the packages may be extremely small, such as a package providing the functionality of padding zeros to an integer (e.g. Left-pad™).

In some cases, the deployment platform may be in charge of obtaining and installing the dependencies when the application is deployed. Such may be the case with packaged code dependencies. Unlike binaries, that may be installed through the operating system's repository, packed code dependencies, also referred to as code packages, may be retrieved from code repositories associated with the technologies the application itself is built with. Code repositories may be typically focused on a specific programming language or runtime platform. Additionally or alternatively, the code repositories may be entirely dedicated to a specific programming language or runtime platform. As non-limiting example, Node Package Manager™ (NPM), may hold code packages written in JavaScript™ and consumed by applications running in a browser or on the Node.js™ runtime. As another non-limiting example, the RubyGems may hold code packages, known as Gems, written in Ruby™ and consumed by Ruby applications. Yet, another non-limiting example, Maven™, the veteran code package repository, may hold packages meant to be executed on the Java™ Virtual Machine (JVM), written primarily in Java™ and more recently in Scala™.

Additionally or alternatively, code packages, similarly to binaries, may often have dependencies of their own. The dependencies may be used by the developers of the package to get the same efficiencies mentioned above. As a result, consuming a single code package may in fact mean consuming many more, at times hundreds, thousands, or the like, of packages with it. Each programming language, runtime and package manager may handle the management of these direct and indirect dependencies differently. However, the concept of these recursive dependencies may exist in all of them.

In some exemplary embodiments, the dependencies may have flaws, such as vulnerabilities, license flaws, security risks, regulation violations, policy violations, or the like. In some exemplary embodiments, the flaw may be a security vulnerability. The flaw may be potentially exploited as a security vulnerability in a more specific context. For example, a dependency may be known to communicate information over HTTP and not HTTPS. While this is not a vulnerability per se, such a flaw may be a vulnerability in certain use cases. Another example of a flaw may be license flaws. If a dependency requires a copyleft license, such as GNU Public License (GPL) Affero General Public License (AGPL), it may be considered a flaw. Yet, another example of flaws may be risk indicators. Metadata which may be indicative of the dependency not being stable may be identified and used to identify a flaw. As an example, consider a dependency which has many open issues logged against it and hasn't been updated in over a long time, such as a year. Such a dependency may be considered as having risk indicators and would therefore not be advisable to be included in the deployment. Yet, another example of flaws may be internal policy violations, such as a dependency which does not match a specifically allowed white/black list or guidelines by the owner of the application. Yet, another example of a flaw may be external regulation violations, such as a dependency which is known to be using a crypto algorithm that violates US export regulations, a dependency that violates the General Data Protection Regulations (GDPR) EU regulations, or the like.

In some exemplary embodiments, infrastructure monitoring products may look for code packages when searching for vulnerable dependencies on the server. These code packages may not be consumed through the repository of the Operating System (OS). Nonetheless, the code package may still eventually land in the repository of the OS as files, and so they can be found after the fact and determine to be vulnerable.

One complexity involved with managing the deployment platforms running applications may be tracking flawed dependencies. Other challenges may include managing capacity to withstand load in an efficient manner; managing user access controls and permissions to each server; tracking performance degradation and instability in long running servers or ones with faulty hardware; or the like. Tackling these complexities may take time and expertise many organizations don't have or don't want to spend. In some exemplary embodiments, to serve such organizations, a Platform-as-a-Service (PaaS) products may be utilized. When using PaaS, a developer may deploy her applications onto the given deployment platform. The platform may abstract and manage the underlying infrastructure needed to operate the applications.

Another deployment model is FaaS that is tuned for running small and often stateless applications. FaaS is often utilizes by developers who split larger applications into smaller components, often referred to as Micro-services. Smaller services may be developed and deployed more autonomously, which may help scale and accelerate software development and deployment. While increasing development efficiencies, Micro-services created challenges when managing running applications. Each service may require at least a minimum amount of overhead to run, supporting the surrounding operating system, web server, or the like. In addition, each service may typically require some minimal cost to support the virtual hardware powering it. These complexities may compete against the desire to make services increasingly granular, which may be the general desire of the software architects.

While in PaaS, the infrastructure may be abstracted, the applications may still know they are running on some machine, and be able to maintain a state, or cache information, in FaaS the deployed application cannot access such information. Although there may be technically a server running the application, the server may not be dedicated to the application. For all intents and purposes, the server as an entity may not exist in the context of the deployed application under FaaS. The server may merely lend its computation capabilities to the application to perform a given transaction. In some exemplary embodiments, FaaS applications may be completely transactional, and need to rely on external data stores for any state.

FaaS may be a relatively powerful approach for completely eliminating the need to do server capacity management. FaaS may encourage small units supporting efficient development, and may dramatically reduce operational costs.

Under FaaS, there are no servers for the application owner to manage. Accordingly, there may be no need for the application owner to manage dependencies while using FaaS. The dependencies may be managed by the provider of the deployment platform. Although this may be even part of the value proposition of FaaS, this may create a technical challenge. Not managing dependencies may eliminate the opportunity to use Infrastructure Monitoring products to uncover vulnerable code packages. Since there are no dedicated servers, there may be no way to track the deployed files and through them, identify the vulnerable packages utilized by the deployed application. In particular, in FaaS, the application owner may not be able to execute a monitoring agent directly on the deployment platform executing her application. As a result, no Infrastructure Monitoring product may be utilized on the FaaS server.

Additionally or alternatively, in PaaS, the application owner may be barred from executing a monitoring agent directly on the server, and hence may face a similar challenge that exists in FaaS. Even in case the PaaS provider allows execution of a monitoring agent, the environment of the server used to provide the PaaS may prevent the monitoring agent from being executed over long periods of time (e.g., hours, days, weeks, or the like). As an example, the application may be migrated from one server to another, requiring the migration of the monitoring agent as well. However, the PaaS may not support migration of such monitoring processes.

In some exemplary embodiments, code dependencies in deployment methodologies such as FaaS and PaaS, may be the responsibility of the application provider. Some FaaS solutions may require the developer to upload those packages alongside its applications, while others may let the developer simply specify which packages the application needs, and the platform may fetch those for the application. In both cases, the application may state which dependencies to use, not the platform. This may be a problem both when collecting the data, as there may be no ability to run an agent on the machine or otherwise query the file system, and when managing them, as there may be no server to associate the discovered artifacts with.

One technical solution of the disclosed subject matter may be mimic the fetching operation of the dependencies, performed by the deployment platform, during deployment. A package specification may be reviewed and based thereon, and based on the time of deployment, the fetched dependencies may be identified. The package specification may be resolved by applying the same rules that the deployment platform applied. In addition, as opposed to obtaining the newest dependencies available that match the package specification, the disclosed subject matter, may identify the older dependency that was fetched at the time of the deployment. Such may be the case, as at the time of the deployment, the newer version was not yet published.

Another technical solution may be providing a novel approach for monitoring for flawed dependencies. The applications may be monitored by interacting with the platform as opposed to running an agent on the servers that run the application. The approach may comprise tracking and monitoring for flaws in the code that was deployed and its state on the platform, as opposed to monitoring the system (server) running it. In some exemplary embodiments, the approach may comprise the steps of: obtaining a list of applications from PaaS; for each application in the list of applications: obtaining a list of dependencies, for each dependency, checking if it is vulnerable, and reporting if a vulnerability is detected.

The disclosed subject matter may provide for one or more technical improvements over any pre-existing technique and any technique that has previously become routine or conventional in the art.

Additional technical problem, solution and effects may be apparent to a person of ordinary skill in the art in view of the present disclosure.

Figure 1A:
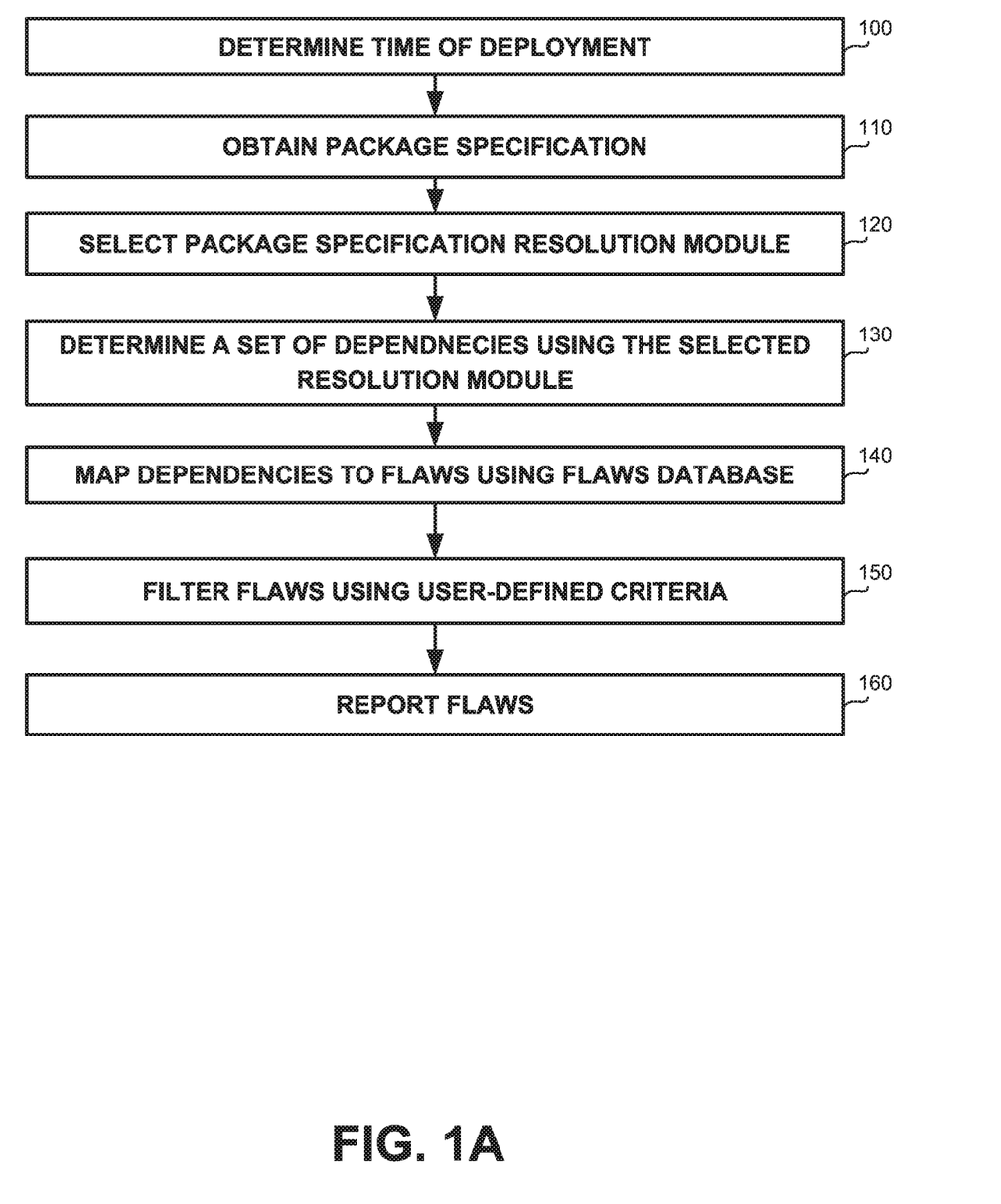
FIG. 1A shows a flowchart diagram of a method, in accordance with some exemplary embodiments of the disclosed subject matter.

Referring now to FIG. 1A showing a flowchart diagram of a method, in accordance with some exemplary embodiments of the disclosed subject matter.

On Step 100, a time of deployment of an application may be determined. The time of deployment may be the time when the application was deployed on the deployment platform. In some exemplary embodiments, the application may have been deployed a while ago, and therefore the dependencies may have been retrieved based on the state of the art at the time of deployment.

On Step 110, a package specification of an application may be obtained. The package specification, such as a package.json file, may be retrieved from the deployment platform. In some exemplary embodiments, retrieval query may be sent to the deployment platform to retrieve the package specification. The package specification may be a specification of dependencies that the deployment platform was entrusted to fulfill.

In some exemplary embodiments, the package specification may comprise version indications for each or some of the dependencies. In some exemplary embodiments, the indication may indicate minimal version number, maximal version number, a range of versions, or the like. In some exemplary embodiments, the indication may require the version to be compatible with another identified version. Additionally, or alternatively, the indication may identify the version number using wildcards. In some cases, the indication may indicate whether pre-release versions, such as a beta version, is acceptable or not. In some exemplary embodiments, the version may be indicated by a string of the following format: X.Y.Z, where X is the major version, Y is the minor version, and Z is the patch version. Y and Z may be optional. In addition, the indication may include a suffix relating to pre-release versions, such as 1.2.3-beta, 1.2.3-beta-2, or the like. The indication may be, for example, one of the following:

"version" (e.g., "1.2.3"), indicating that the version must match version exactly;

">version" (e.g., ">2.1"), indicating that the version must be greater than version;

">=version", indicating that the version must be greater or equal to version;

"<version", indicating that the version must be smaller than version;

"<=version", indicating that the version must be smaller or equal to version;

"~version", indicating that the version is approximately version. In some cases, the version and patch-level changes thereof are acceptable. In case the version specified does not comprise a minor version, minor-level changes in the version are also acceptable; and "^version", indicating a version compatible with version. In some cases, such indication may allow changes that do not modify the left-most non-zero digit in the [major, minor, patch] tuple.

In some cases, ranges of versions may be expressed, such as using a hyphen (version1-version2), using a wildcard (e.g., "*" or "x" as a wildcard in the [major, minor, path] tuple), or the like.

In some exemplary embodiments, the package specification may indicate which code repository is searched. In some cases, a list of alternative code repositories and their precedence may be specified in the package specification. In some cases, the repositories searched may be predetermined by the deployment platform, and such indications may be ignored.

On Step 120, a resolution module may be selected. In some exemplary embodiments, a plurality of package specification resolution modules may be available, each of which may be associated with a different deployment platform. Each resolution module may mimic the resolution performed by the associated deployment platform. Based on the identity of the deployment platform, a resolution module may be selected.

In some exemplary embodiments, several resolution modules may be available for the same platform, each of which corresponding a different version of the platform. In such a case, the version which was relevant and available at the time of deployment may be selected, so as to select a module that matches the actual resolution that was performed at deployment.

In some exemplary embodiments, different platform providers may implement different extrapolation of the package specification. The different resolution modules may allow accurate simulation of the extrapolation performed by different providers.

As an example, a package.json file can provide version requirement with respect to package "qs". It may indicate that "qs" is to be obtained from the Npm™ code repository, at version "^1.2.3". Such a requirement may be translated as requiring a newer version than 1.2.3, without advancing the major version. The latest version that fits such requirement may be 1.2.6, in which case platforms would generally provide 1.2.6. However, when version 1.2.7 comes out, some platforms may delay before including it, while others would include it immediately. Some platforms may include a beta version (e.g. 1.2.6-beta) while others won't. In addition, some platforms may ignore the code repository and search their dedicated code repository instead of searching in Npm™. Hence, the same package specification may be resolved to yield different dependencies.

In some exemplary embodiments, some platforms may attempt to synchronize concurrent servers running the application, impacting their choice of version extrapolation. Consider an application using qs @ 1.2.6 is running, and assume version 1.2.7 is released. In case the platform needs to install a new server to migrate to or serve as a replica server, the new version resolution of the new server may be affected by the previous installation. In some exemplary embodiments, in order to maintain consistency between different running instances, version 1.2.6 may still be used. Additionally or alternatively, the platform may define when to implement the update and "catch up" with the latest version. In some cases, the application may be re-deployed with the updated version to maintain consistency. In some exemplary embodiments, the newer version, version 1.2.7, may be used immediately.

In view of the above, each platform may utilize a different logic to resolution of the version requirement provided by the package specification. Each resolution module may implement such different resolution logic.

On Step 130, the resolution module is applied to obtain a set of dependencies. The resolution module may be applied to resolve the package specification in a manner mimicking the resolution performed by the deployment platform, at the time of deployment. It will be noted that the same package specification may yield different dependency trees when resolved at different points of time, as new versions of those packages are released. The package specification may be analyzed and dependencies gathered and stored so as to obtain the up-to-date versions of each dependency as were present when the application was deployed. Newer versions may be overlooked.

In some cases, in order to resolve the package specification in a manner simulation the behavior at a previous point in time, snapshots of the code repository may be utilized. In some cases, the disclosed subject matter may monitor the code repositories and maintain the snapshots directly. Additionally, or alternatively, the code repositories themselves may maintain the snapshots, such as by providing a timestamp of availably for each version, providing an Application Programming Interface (API) enabling fetching of older versions, or the like.

On Step 140, the dependencies may be mapped to the flaws database to determine flaws thereof. The specific version of each dependency may be checked for flaws.

On Step 150, user-defined criteria may be applied on the flaws to determine reportable flaws. In some cases, not all flaws may be reported. The user may define rules to determine which flaws would be reported. For example, a criteria may be defined to determine a level of risk indicators that would cause a dependency to be reported as having a vulnerability. Additionally or alternatively, guidelines of the application may be provided, such as use of HTTPS, ban of specific module or communication method, or the like. Dependencies which violate the guideline may be reported as having a flaw. In some exemplary embodiments, the criteria may be a definition of acceptable contractual obligations in a license, such as accepting attribution obligation, declining free patent license, declining copy-left license, or the like.

On Step 160, the flaws may be reported. The report may be sent directly to the owner of the deployed application, to an administrator, or the like. In some exemplary embodiments, the report may be transmitted via email, shown in a web-based portal, provided in other digital manner to a user, or the like. The report may indicate the flaws that exist in the deployed application and which warranted reporting. In some exemplary embodiments, the report may provide a suggested fix to overcome the flaw, such as require an updated version of a dependency, suggest an alternative dependency to replace the flawed dependency (e.g., not necessarily a different version of the same dependency, but potentially an alternative code package providing a same functionality as the flawed dependency), or the like. In some exemplary embodiments, instead of reporting, the fix may be applied automatically. In some exemplary embodiments, the fix may be applied by applying a patch to the dependency that is known to fix the flaw. Additionally or alternatively, a newer version of the dependency may be fetched and deployed instead of the version having the flaw. In some exemplary embodiments, the package specification may exclude the use of the newer version, and the user may be prompted to approve a modification to the package specification so as to allow for the installation or patching of versions that do not comprise the flaw. In some cases, a fix report may be provided. The fix report may be provided when the fix is performed, when the user queries for such information, or the like.

Figure 1B:
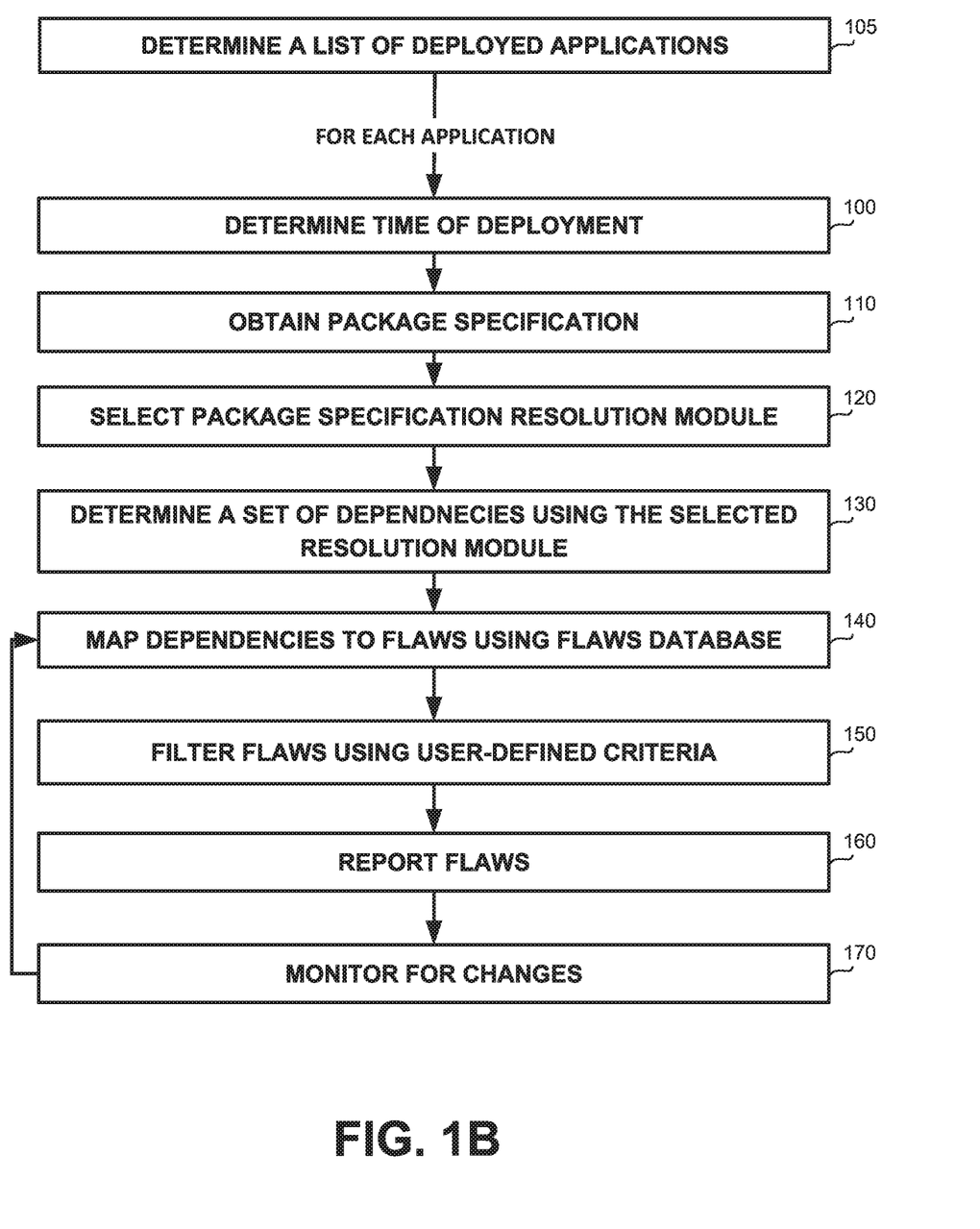
FIG. 1B shows a flowchart diagram of a method, in accordance with some exemplary embodiments of the disclosed subject matter.

Referring now to FIG. 1B showing a flowchart diagram of a method, in accordance with some exemplary embodiments of the disclosed subject matter.

On Step 105, a list of deployed applications on the deployment platform may be obtained. In some exemplary embodiments, the deployment platform may have a dedicated API that can be used to query the deployment platform and in response the list of deployed applications may be retrieved. As an example, in AWS Lambda™ a list of functions is available. As another example, in Heroku™, "/apps" API endpoint is available. In some exemplary embodiments, the list of applications may be extracted by using the API with the appropriate access credentials, thereby obtaining a list of deployed applications associated with an administrator or owner of code.

Additionally, or alternatively, the deployed applications may comprise code that is configured to report the existence of the deployed application on the deployment platform. In some cases, the code, or code package, may transmit a message to a monitoring system. The monitoring system may gather reports from applications, and aggregate them to determine the list.

On Step 170, each application may be repeatedly polled to check if any changes were made to the deployed application. Changes may include modification to the application or its metadata. The changes may be mapped to identify whether additional flaws are added. Additionally, or alternatively, it may be determined whether any of the flawed dependencies that were previously identified were removed from the deployed application.

In some exemplary embodiments, changes to the deployed application may be communicated using a built-in platform capability, such as a web hook.

In some exemplary embodiments, the changes may be tracked through consumption of relevant events from the platform. Some deployment platforms may send events to the client. The events may allow a client to be notified when the deployed application is updated, but may be utilized to automatically track changes by the disclosed subject matter. Additionally or alternatively, the application may be polled periodically to inspect whether it has changed.

In some exemplary embodiments, alerts may be provided to users when a newly disclosed flaw impacts their dependencies. In some exemplary embodiments, the dependencies extracted from the platform may be periodically examined for flaws, such as by periodically querying flaws database. Additionally or alternatively, the list of dependencies and their related metadata (e.g., version) may be stored. When a new flaw is disclosed, such as when the flaws database is updated to add a new flaw, the new flaw may be checked against the list of dependencies. In some exemplary embodiments, it may be checked whether any of the list of dependencies fall into the flaw ranges stated for the new flaw.

Figure 1C:
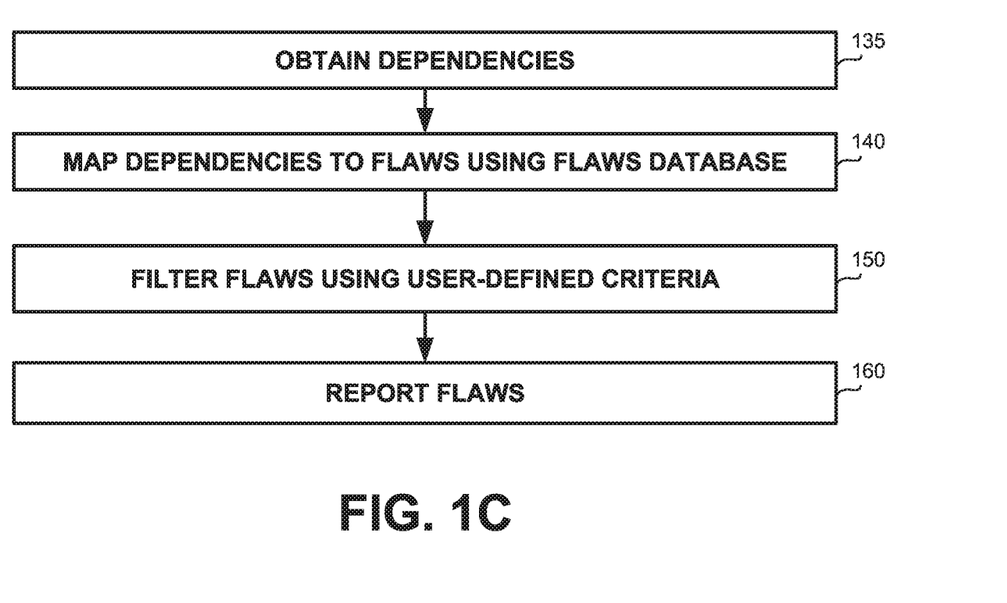
FIG. 1C shows a flowchart diagram of a method, in accordance with some exemplary embodiments of the disclosed subject matter.

Referring now to FIG. 1C showing a flowchart diagram of a method, in accordance with some exemplary embodiments of the disclosed subject matter.

On Step 135, dependencies may be obtained. In some exemplary embodiments, the dependencies may be deployed with the code. In such a case, the full application/function files or the necessary information about the application may be fetched from the deployment platform. As an example, the ZIP file for an AWS Lambda™ function may be downloaded to fetch the list of dependencies for a deployed application in such a deployment platform. The list of code dependencies may be identified in the fetched files.

Additionally, or alternatively, the deployed application may push information regarding its dependencies at certain points in time during their startup and runtime. The pushed information may be analyzed to determine the list of dependencies.

Figure 2:
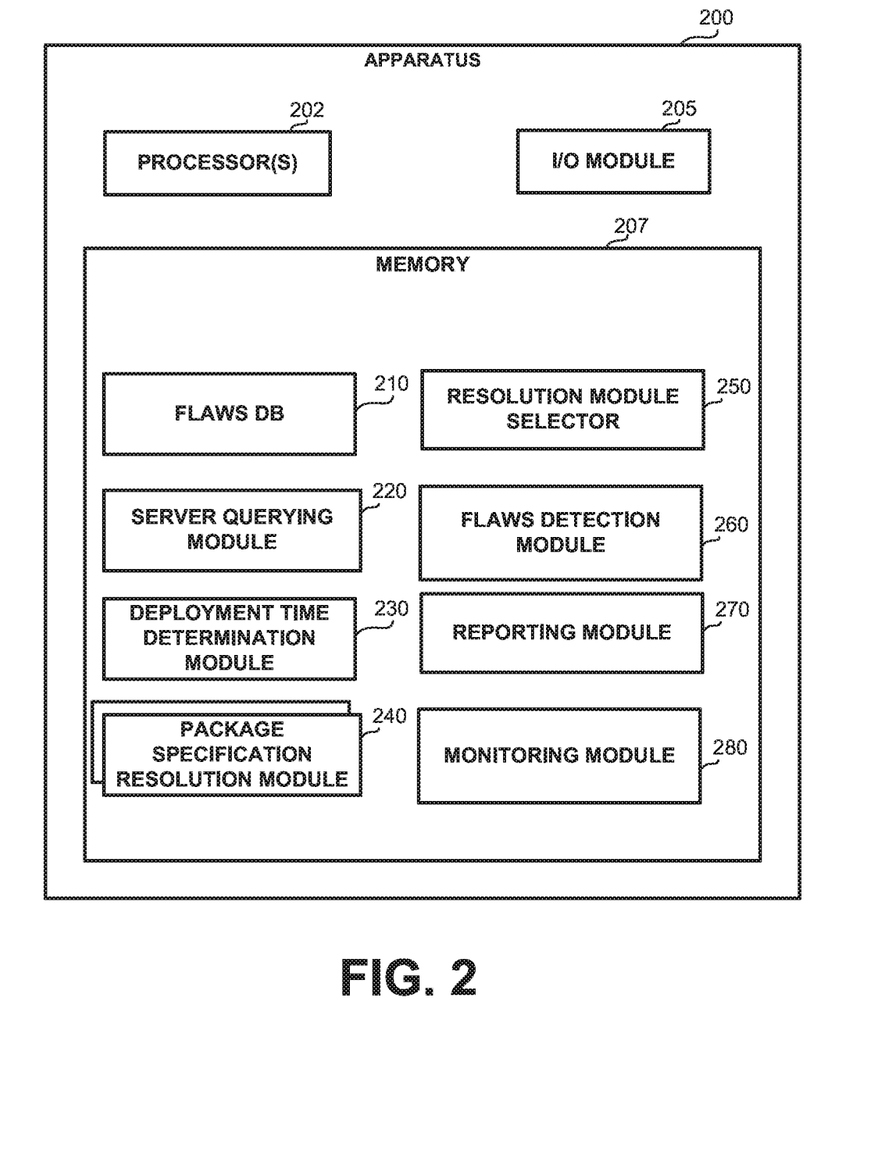
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) module 205. I/O Module 205 may be utilized to provide an output to and receive input from a user, such as, for example provide user-defined criteria for filtering flaws, output reports to the users, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200. In some exemplary embodiments, Memory 207 may retain Flaws Database 210. Additionally, or alternatively, Flaws Database 210 may be retained in a remote storage, such as in a remote datastore (not shown).

A Server Querying Module 220 may be configured to query the deployment platform to retrieve a package specification.

A Deployment Time Determination Module 230 may be configured to determine a time of deployment of a deployed application. The time of deployment may be the time when the application was deployed on the deployment platform, and when the deployment platform had retrieved the dependencies.

Package Specification Resolution Modules 240 may be configured to mimic how different deployment platforms extrapolate the dependencies based on the package specification at the time of deployment.

Resolution Module Selector 250 may be configured to select a matching package specification resolution module from the plurality of such modules (240), such as based on the identity of the deployment platform on which the deployed application is deployed, based on the deployment time, or the like.

Flaws Detection Module 260 may be configured to query the Flaws Database 210 to retrieve a set of flaws in the set of dependencies determined by a Package Specification Resolution Module 240

Reporting module 270 may be configured to issue a report to a user regarding reportable flaws in the deployed application.

Monitoring Module 280 may be configured to monitor to monitor for updates in the flaws database, and invoke Reporting Module 270 based on new flaws relevant to the application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method performed by a processing apparatus external to a deployment platform, wherein said method comprising:
   obtaining a list of dependencies used by a deployed application that is deployed on the deployment platform, wherein said obtaining is based on a time of deployment of the deployed application, the time of deployment comprising an initial time during which the deployed application was deployed on the deployment platform, wherein before the initial time the deployed application was not deployed on the deployment platform, wherein the list of dependencies comprises a first version of a dependency, wherein said obtaining is performed at a later time than the time of deployment, the first version of the dependency was available during the time of deployment, wherein a second version of the dependency is available at the later time, the second version of the dependency being a newer version of the dependency than the first version of the dependency, the newer version of the dependency was not available during the time of deployment, wherein the second version is different than the first version, wherein the list of dependencies excludes the second version of the dependency;
   mapping each dependency of the list of dependencies with a flaws database, the flaws database comprising an indication of known flaws for different dependencies and different versions thereof;
   based on said mapping, determining one or more flaws in the deployed application, wherein said determining the one or more flaws is performed externally to the deployment platform and without executing a monitoring process thereon;
   filtering the one or more flaws using at least one criterion, whereby obtaining one or more reportable flaws; and
   reporting the one or more reportable flaws to a developer of the deployed application.

2. The method of claim 1, wherein said reporting the one or more reportable flaws is performed without executing processes on the deployment platform, using an external processing apparatus in network communication with the deployment platform to mitigate a lack of processing resources available at the deployment platform.

3. The method of claim 1,
   wherein said obtaining the list of dependencies comprises:
      obtaining a package specification of the deployed application, and extrapolating the list of dependencies based on the package specification and based on the time of deployment of the deployed application.

4. The method of claim 1, wherein the deployment platform is a Function as a Service (FaaS) platform upon which the deployed application is deployed, whereby the deployed application has no access to a machine of the deployment platform on which the deployed application is running and does not maintain any cache information.

5. The method of claim 1, further comprising: monitoring updates in the flaws database to identify flaws relevant for the deployed application; and in response to identifying a new flaw in the deployed application, reporting the new flaw.

6. The method of claim 1, wherein the at least one criterion comprises a user-defined criterion, the method further comprising:
   determining, based on the user-defined criterion, whether a determined flaw is to be reported; and
   reporting only a subset of the flaws that match the user-defined criterion.

7. An apparatus that is external to a deployment platform, the apparatus comprising a processor and coupled memory, the processor is adapted to:
   obtain a list of dependencies used by a deployed application that is deployed on the deployment platform, wherein said obtaining is based on a time of deployment of the deployed application, the time of deployment comprising an initial time during which the deployed application was deployed on the deployment platform, wherein before the initial time the deployed application was not deployed on the deployment platform, wherein said obtaining is performed at a later time than the time of deployment, wherein the list of dependencies comprises a first version of a dependency, the first version of the dependency was available during the time of deployment, wherein a second version of the dependency is available at the later time, the second version of the dependency being a newer version of the dependency than the first version of the dependency, the newer version of the dependency was not available during the time of deployment, wherein the second version is different than the first version, wherein the list of dependencies excludes the second version of the dependency, wherein said obtaining the list of dependencies comprises one of the following:
      (1) sending a query via an Application Programming Interface (API) of the development platform to obtain the list of dependencies of the deployed application;
      (2) obtaining application files of the deployed application via the API of the development platform, wherein the application files are files uploaded to the deployment platform by a developer of the deployed application at or before the time of deployment; and extracting the list of dependencies from the application files; and
      (3) obtaining a package specification of the deployed application and extrapolating the list of dependencies based on the package specification and based on the time of deployment of the deployed application;
   map each dependency of the list of dependencies with a flaws database, the flaws database comprising an indication of known flaws for different dependencies and different versions thereof;
   based on said mapping, determine one or more flaws in the deployed application, wherein said determining the one or more flaws is performed externally to the deployment platform and without executing a monitoring process thereon;

filter the one or more flaws using at least one criterion, whereby obtaining one or more reportable flaws; and
report the one or more reportable flaws to the developer of the deployed application.

8. The apparatus of claim 7, wherein the deployment platform is a Function as a Service (FaaS) platform upon which the deployed application is deployed, whereby the deployed application has no access to a machine of the deployment platform on which the deployed application is running and does not maintain any cache information.

9. The apparatus of claim 7, wherein the deployment platform is a Platform as a Service (PaaS) platform upon which the deployed application is deployed.

10. The apparatus of claim 7 wherein said processor is configured to monitor for updates in the flaws database to identify flaws relevant for the deployed application, and in response to identifying a new flaw in the deployed application, report the new flaw.

11. The apparatus of claim 7, wherein said processor is configured to perform said report the one or more reportable flaws without executing processes on the deployment platform, using an external processing apparatus in network communication with the deployment platform to mitigate a lack of processing resources available at the deployment platform.

12. The apparatus of claim 7, wherein the package specification is a specification file comprising the list of dependencies, wherein for each dependency in the list of dependencies, the specification file provides a respective version indication, wherein for at least one dependency in the list of dependencies, the respective version indication in the specification file is one of the following:
   a minimal version number;
   a maximal version number;
   a version compatible with another identified version;
   an expression using wildcards representing a version number; and
   a range of versions.

13. The apparatus of claim 7, wherein the known flaws comprise at least one of:
   security vulnerabilities;
   license flaws;
   internal policy violations; and
   external regulation violations.

14. The apparatus of claim 7, wherein the flaws database indicates different flaws of different versions of a same dependency.

15. The apparatus of claim 7, wherein the list of dependencies is a set of code package dependencies.

16. A non-transitory computer readable medium comprising instructions, wherein said instructions, when read by a processor of a processing apparatus that is external to a deployment platform, cause the processor to perform:
   obtaining a list of dependencies used by a deployed application that is deployed on the deployment platform, wherein said obtaining is based on a time of deployment of the deployed application, the time of deployment comprising an initial time during which the deployed application was deployed on the deployment platform, wherein before the initial time the deployed application was not deployed on the deployment platform, wherein said obtaining is performed at a later time than the time of deployment, wherein the list of dependencies comprises a first version of a dependency, the first version of the dependency was available during the time of deployment, wherein a second version of the dependency is available at the later time, the second version of the dependency being a newer version of the dependency than the first version of the dependency, the newer version of the dependency was not available during the time of deployment, wherein the second version is different than the first version, wherein the list of dependencies excludes the second version of the dependency, wherein said obtaining the list of dependencies comprises one of the following:
   (1) sending a query via an Application Programming Interface (API) of the development platform to obtain the list of dependencies of the deployed application;
   (2) obtaining application files of the deployed application via the API of the development platform, wherein the application files are files uploaded to the deployment platform by a developer of the deployed application at or before the time of deployment; and extracting the list of dependencies from the application files; and
   (3) obtaining a package specification of the deployed application and extrapolating the list of dependencies based on the package specification and based on the time of deployment of the deployed application;
   mapping each dependency of the list of dependencies with a flaws database, wherein the flaws database comprising an indication of known flaws for different dependencies and different versions thereof;
   based on said mapping, determining one or more flaws in the deployed application, wherein said determining the one or more flaws is performed externally to the deployment platform and without executing a monitoring process thereon;
   filtering the one or more flaws using at least one criterion, whereby obtaining one or more reportable flaws; and
   reporting the one or more reportable flaws to the developer of the deployed application.

17. The non-transitory computer readable medium of claim 16, wherein said reporting the one or more reportable flaws is performed without executing processes on the deployment platform, using an external processing apparatus in network communication with the deployment platform to mitigate a lack of processing resources available at the deployment platform.

18. The non-transitory computer readable medium of claim 16, wherein the deployment platform is a Function as a Service (FaaS) platform upon which the deployed application is deployed, whereby the deployed application has no access to a machine of the deployment platform on which the deployed application is running and does not maintain any cache information.

19. The non-transitory computer readable medium of claim 16, wherein the instructions further cause the processor to: monitor updates in the flaws database to identify flaws relevant for the deployed application; and in response to identifying a new flaw in the deployed application, report the new flaw.

20. The non-transitory computer readable medium of claim 16, wherein the at least one criterion comprises a user-defined criterion, wherein the instructions further cause the processor to:
   determine, based on the user-defined criterion, whether a determined flaw is to be reported; and
   report only a subset of the flaws that match the user-defined criterion.

* * * * *